US008881446B2

(12) United States Patent
Gao

(10) Patent No.: US 8,881,446 B2
(45) Date of Patent: Nov. 11, 2014

(54) ELECTRONIC FISHING LURE WITH TOUCH CONTROL

(76) Inventor: Jun Gao, Livingston, NJ (US)

( * ) Notice: Subject to any disclaimer, the term of this patent is extended or adjusted under 35 U.S.C. 154(b) by 414 days.

(21) Appl. No.: 13/238,673

(22) Filed: Sep. 21, 2011

(65) Prior Publication Data

US 2013/0067791 A1    Mar. 21, 2013

(51) Int. Cl.
*A01K 75/02*    (2006.01)
*A01K 85/01*    (2006.01)

(52) U.S. Cl.
CPC .................................... *A01K 85/01* (2013.01)
USPC ......................................... 43/17.6; 43/42.31

(58) Field of Classification Search
USPC ............................................... 43/17.6, 42.31
See application file for complete search history.

(56) References Cited

U.S. PATENT DOCUMENTS

| 2,536,408 A | 1/1951 | Addicks |
| 4,437,256 A | 3/1984 | Kulak |
| 4,669,213 A * | 6/1987 | LeRoy ............................ 43/17.6 |
| 5,392,555 A * | 2/1995 | Tingey ............................ 43/17.6 |
| 5,461,815 A * | 10/1995 | Rodgers .......................... 43/17.6 |
| 7,669,360 B2 * | 3/2010 | Davidson ........................... 43/17 |
| 7,707,764 B1 | 5/2010 | Osburn |
| 8,312,669 B2 * | 11/2012 | Thomas ....................... 43/42.31 |
| 2006/0010763 A1 | 1/2006 | Podlewski |
| 2009/0007480 A1 | 1/2009 | Braun |
| 2010/0175304 A1 | 7/2010 | Barmore |
| 2011/0099882 A1 * | 5/2011 | Young ............................ 43/17.6 |

* cited by examiner

*Primary Examiner* — Christopher P Ellis
(74) *Attorney, Agent, or Firm* — Michael J. Brown

(57) ABSTRACT

The present invention is a fishing lure which utilizes an onboard controller to control one or a series of light (multi-color/mono color) sources so as to enhance fishing lure's color and visibility for all light conditions a user may encounter during fishing. The controller unit, power source, light sources of the present invention are all contained in a sealed housing. The switching mechanism, controlling mechanism, and charging mechanism are all multiplexed into two electrical contact points. The electrodes are embedded in the electronic body parts and embedded in the housing therefore eliminating water leaking through active seams or openings. The present invention further provides a safe and effective charging mechanism which involves an electronic component barrier to prevent current from flowing from one electrical contact point to the other during charging.

8 Claims, 3 Drawing Sheets

ELECTRONIC FISHING LURE WITH TOUCH CONTROL

BACKGROUND OF THE INVENTION

1. Field of the Invention

The present invention relates to an electronic fishing lure, and more particularly to an electronic fishing lure that utilizes onboard circuitry to control one or a series of light (multicolor/mono color) sources so as to enhance the fishing lure's color and visibility for all light conditions a user may encounter during fishing.

2. Description of Related Art

Electronic fish lures employing a source of illumination to attract fish are known in the prior art as is evidenced by virtue of the teachings and structure contained in the U.S. Pat. Nos. 2,536,408; 4,437,256; and 4,669,213.

Although these prior art meet their specific needs, in most prior art, there is no effective controllability over turning the illumination source on and off, or changing its the lighting mode. The lighting mode cannot be readily switched; thus, the fish lure appearance cannot be easily changed based on the fly.

Prior art published in recent years provides means to control illumination color and intensity. By way of example, U.S. Pat. No. 7,707,764 to Osburn discloses a light emitting fishing lure, where the illumination source is turned on when the fish lure submerges into the water and is turned off when the fish lure is taken out of the water. Similarly, U.S. PreGrant Publication No. 2010/0175304 to Barmore discloses a fish lure including an electrical unit that can control illumination and sound emissions. U.S. PreGrant Publication No. 2009/0007480 (WO2005084431A1, EP1725092A1) to Braun discloses a fishing lure and a system for operating and controlling said fishing lure. The fishing lure contains a microprocessor and is controllable via a switch on the lure or a remote control, which can be used to select various operating modes such that the lure can produce any movement, desired color, or pattern of colors, to emulate the body of a desired bait fish. Braun discloses the use of a remote infrared transmitter to change the operational modes of the fish lure. Likewise, U.S. PreGrant Publication No. 2006/0010763 to Podlewski et al. discloses a programmable fishing lure containing an onboard microcontroller that is controllable via a switch on the lure or a remote control. The lights and sound devices of the Podlewski fish lure can be controlled using control firmware in an on-board microcontroller, with programming signals being input through an inductor USB port. These prior art devices include complex control interfaces for activating or changing the functions of the fishing lure.

Our present invention is distinguished from these prior art in that our present invention has control mechanism, switch mechanism, and charging mechanism all multiplexed into a pair of electrical contact points. The microcontroller controls lighting mode in response to simple signals received at the electrical contact points, either by a user touching the contact points, or by immersing the lure in water. Furthermore, our present invention provides solution to other aforementioned problems, such as recharging the battery.

SUMMARY OF THE INVENTION

The primary object of the present invention is to enhance fishing lure's color and visibility by one or a series of light (multicolor/mono color) sources with an onboard controller and an effective way of configuring the color and light intensity of such light sources.

Another object of the present invention is to let the user to be able to turn on and turn off the light of fishing lure.

Another object of the present invention is to let the user have the control to switch various lighting mode, such as brightness, color, flash mode and etc.

Another object of the present invention is to have the switching mechanism, controlling mechanism, and charging mechanism are all multiplexed into two electrical contact points such that there is no need for extra charging port or switch to control the light mode, switch power on and off or charge the lure through.

A yet another object of the present invention is to provide a safe and effective charging mechanism.

The present invention utilizes an onboard circuitry to control one or a series of light (multicolor/mono color) sources so as to enhance fishing lure's color and visibility for all light condition a user may encounter during fishing. For instance, during low light murky fishing, an angler can turn the light intensity up to a more penetrating color. While under sun lit clear water or dealing with spooky species in the dark, an angler can simply turn the light off or with turn to a low level setting. The light switch on/off and lighting mode or sequence can be controlled by on an on board circuitry.

The present invention provides all the controller unit, power source, light source in a sealed translucent housing. The switching mechanism, controlling mechanism, and charging mechanism are all multiplexed into two electrical contact points, that most lure uses as eyelets to connect the fishing hooks. No extra charging port or switch is needed to control the lighting mode, switch power on/off or charge the lure through.

The more important features of the invention have thus been outlined in order that the more detailed description that follows may be better understood and in order that the present contribution to the art may better be appreciated.

Additional features of the invention will be described hereinafter and will form the subject matter of the claims that follow.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention and that such other structures do not depart from the spirit and scope of the invention in its broadest form.

BRIEF DESCRIPTION OF THE DRAWINGS

Other aspects, features, and advantages of the present invention will become more fully apparent from the following detailed description, the appended claim, and the accompanying drawings in which similar elements are given similar reference numerals.

DESCRIPTION OF THE PREFERRED EMBODIMENT

Figure 1:
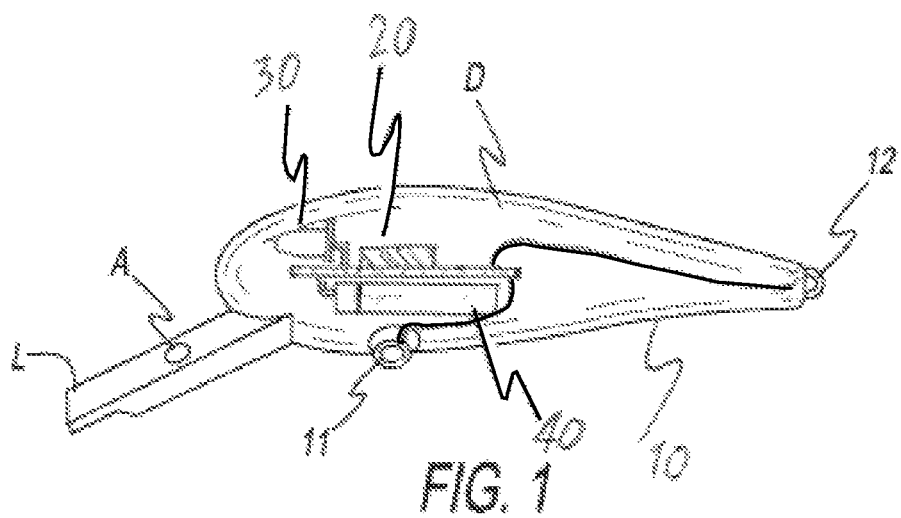
FIG. 1 is a cutaway side view of an embodiment of a fish lure of the present invention wherein two eyelets for the electrical contact points are at the tail and at the belly of the fish lure.

FIG. 1 is a perspective view showing the external appearance of a fish lure 10 of the present invention. As with many existing lures, the lure has a leading lip L with an eyelet A for attaching to a fishing line. The fish lure has two electrical contact points, eyelets 11 and 12. The switching mechanism, controlling mechanism, and charging mechanism are all multiplexed into these two electrical contact points 11 and 12. No extra charging port or switch is needed to control the lighting mode, switch the power on/off or charge the battery inside the fish lure.

Figure 2:
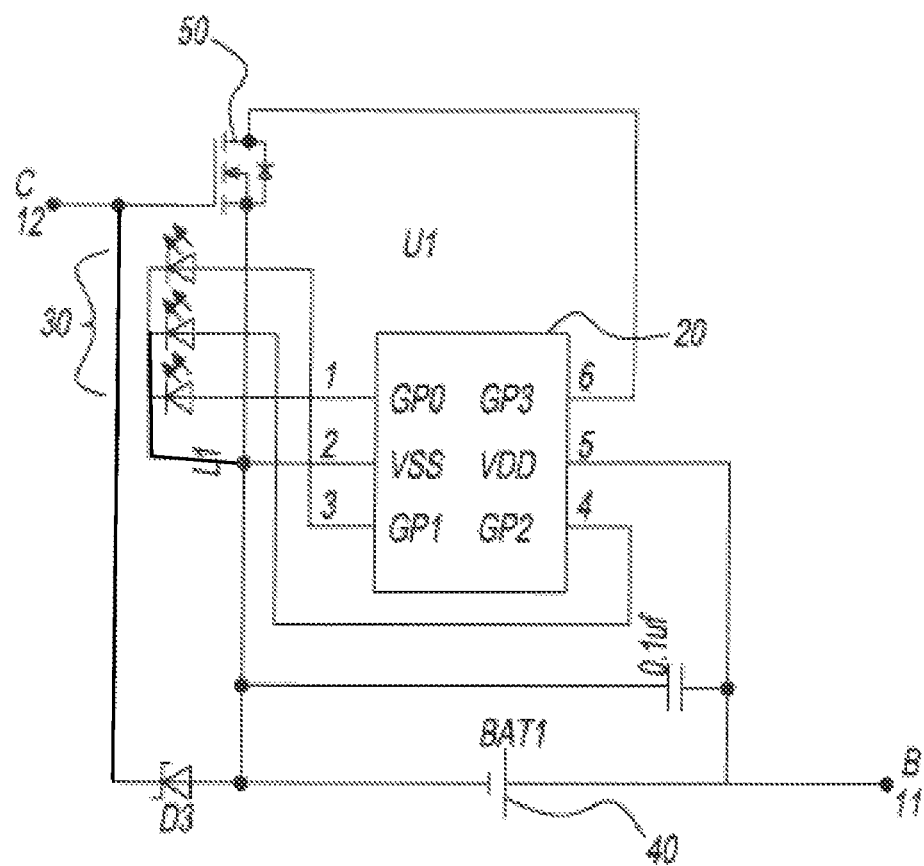
FIG. 2 is an electrical schematic diagram of an embodiment of the present invention showing the controller unit, power source, and light source.

FIG. 2 is an example schematic diagram of one implementation of the present invention showing the controller unit, power source, and light sources (or illumination means). All these electronic components are contained in a sealed waterproof compartment forming the body of the fishing lure 10. The example controller unit is a microcontroller 20, which may be a Microchip model PIC10F20SOT in one of the embodiments. Other microcontrollers or application specific integrated circuits may be used for the control circuitry, as is known in the art. The light sources (illumination means) including a plurality of different colored lights 30 which may be light emitting diodes (LEDs) or any other source of light of primary color (red, blue, and green) which are electrically connected to the microcontroller 20. The lights can be individually controlled by the microcontroller 20. In an embodiment where three LEDs of primary color are used, the three LEDs are closely positioned such that the combined emitted light in can produce different colors and intensities by altering the output of each individual LED. The adjustment of each LED 30 can be controlled by the pre-programmed timing sequence stored in the microcontroller 20. Therefore, an angler can turn the light intensity up to a more penetrating color during fishing in murky water. While under sunlit clear water or dealing with species that live in the dark and are easily spooked, the angler can simply turn the light off or turn to a low level setting. In one of the preferred embodiments, the LEDs 30 may be LED-RGB -5 mm model. The power source 40 including at least one rechargeable battery is electrically connected with microcontroller 20 and light sources (illumination means) 30. In one of the embodiments, the chargeable power source 40 may be a lithium polymer rechargeable battery (LIPo 3.7V). The advantages of lithium polymer design over the lithium-ion design include potentially lower cost of manufacture, adaptability to a wide variety of packaging shapes, and lighter weight. The embodiment further includes a field effect transistor 50, which is N-type metal-oxide-semiconductor-field-effect transistor (N-MOSFET) in FIG. 1.

In addition to their normal function for connecting the fishing lure to a line, the eyelets 11 and 12 function as the electrical contact points where the switching mechanism, controlling mechanism, and charging mechanism are multiplexed into. The physical contact points are electrically connected with the power source 40, and the microcontroller 20. When the fish lure submerges in the water or is touched by hand, the circuit between contact points 11 and 12 is completed; the contact points 11 and 12 become of the same electrical potential allowing current from the power source 40 to travel to the LEDs 30 and microcontroller 20. The completion of circuitry also activates microcontroller 20, which can then execute appropriate operations in response to a signal sent out from contact points 11 and 12, to control different aspect of the light pattern including light color, intensity, etc. according to pre-programmed timing strategy/sequence.

The lure does not have to light up as soon as it hits the water like most of the electronic fish lures in the prior art. Instead, the present invention can include timing delay, allowing the fish lure to wait for a period of time before activating the lights. Such a timing strategy during that period of time gives the user a window to control different lighting aspects.

Figure 5:
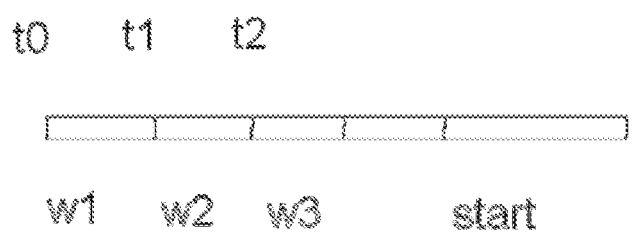
FIG. 5 is a timing diagram of an example timing strategy for the present invention.

An example of a timing strategy (sequence) for color and illumination including timing points and aspects of function is presented in the timing diagram in FIG. 5.

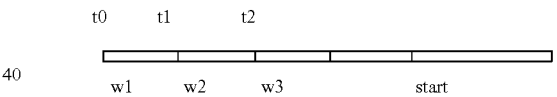

In the timing diagram in FIG. 5, each of t0, t1 and t2 represent a distinct point in time. t0 is the moment in time when contact points 11 and 12 become of the same electrical potential; typically, when the fish lure submerges into the water. t1, t2, and later points to are time points defined by the control circuitry for other purposes. W in FIG. 5 represents the control window. Each different window corresponds to a different time interval, for example, w1 corresponds to the time interval between t0 and t1 and w2 corresponds to the time interval between t1 and t2, and is assigned a different aspect of the function.

For example,
t1=1s; t2=1.5s; . . . .
w1-> change color; w2-> change light intensity and so on . . . .

When the fish lure submerges in water for 0.8 second and is then taken out of the water (or contact points 11 and 12 are touched by hand and held for 0.8 second), the lure will change its color to the next defined color. When the same happens for 1.3 second, the lure will change its light intensity to its next defined level.

The multiplexing feature of the present invention is preferably implemented as programming in the control circuitry. An example of pseudo-code for such programming is shown below:

```
WakeUp                          // Program start from here when wake up
                                from GP3 change
                                // say from lure getting touched or dipped
                                in the water
    if ( GP3 != 1 )             //checking GP3 is 1 when see if 11 and 12
                                close
        goto Sleep;             //if not shut down
    reset iTimer0;                    //Begin timer iTimer0
Control_Window_Loop             //Enter control Window
    if (GP3 != 1 )
    {
        if (iTimer0 elapsed window w3)
            goto Duty_Window_Loop  ;     //If time elapsed out of
                                         control window
                                         //then goto duty window
        if (iTimer0 elapsed window w2)
            iCurretBrightness++; // Toggle to Next Brightness
        if (iTimer0 elapsed window w1)
            iCurrentPatent++; // Toggle to Next Light Mode i
    }
    goto Control_Window_Loop   //Loop back to the current control
                                window
Duty_Window_Loop
    Light the lights according to iCurrentPatent|iCurrentBrightNess;
    if (GP3 != 1 )          //checking GP3 if 11 and 12 are open
        goto Sleep
    goto Duty_Window_Loop
Sleep
    Turn off power
```

Figure 3:
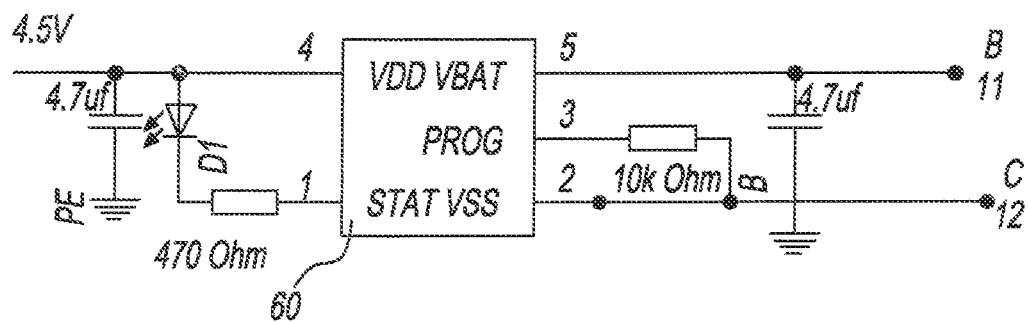
FIG. 3 is an electrical schematic diagram of an embodiment of the present invention showing the battery recharging system.
Figure 4A:
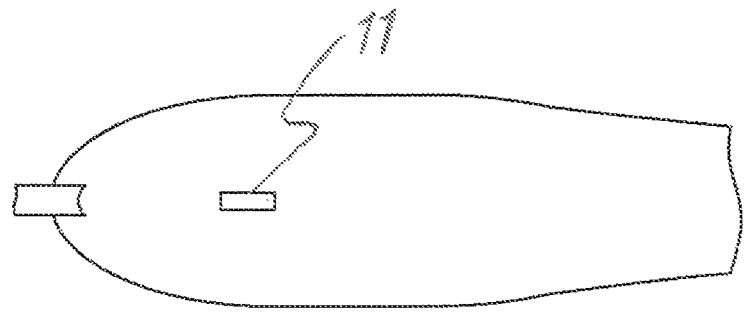
FIG. 4a is a bottom perspective view of an embodiment of a fish lure of the present invention.
Figure 4B:
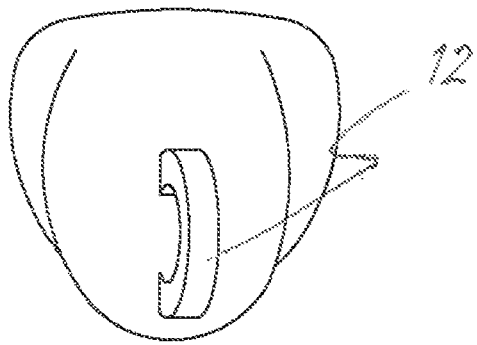
FIG. 4b is a front end perspective view of an embodiment of a fish lure of the present invention.

A safe and effective charging mechanism may be in one embodiment a solar cell or, in another embodiment an electrical circuit, a schematic diagram of which is disclosed in FIG. 3 wherein a recharging mechanism is presented. In this embodiment, charger 60 is used to recharge the battery 40 which may be model MCP7383SOT. The electrical contact points 11 and 12 are used as charge terminals. A rectifier diode as electric barrier is used to prevent current from flowing from one contact 11 to the other 12 so that the electricity can only flow one way, the direction of the charger. By adding an electronic component barrier, contact point 11 and contact point 12 can be used as charging terminals.

All the components, microcontroller 20, rechargeable battery 40, light source 30, are all contained in a sealed waterproof housing.

While there have been shown and described and pointed out the fundamental novel features of the invention as applied to the preferred embodiments, it will be understood that the foregoing is considered as illustrative only of the principles of the invention and not intended to be exhaustive or to limit the invention to the precise forms disclosed. Obvious modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplated All such modifications and variations are within the scope of the invention as determined by the appended claims when interpreted in accordance with the breadth to which they are entitled.

What is claimed is:

1. An electronic fish lure comprising:
    a. a waterproof housing having an outer surface, an internal compartment and a pair of electrical contact points located on the outer surface; wherein said contact points are capable of receiving user-generated input control signals prior to casting;
    b. a control circuitry located within the compartment and electrically connected with the electrical contact points to receive user-generated input control signals, where the control circuitry comprises multiplexing programming to convert the user-generated input control signals received from the electrical contact points into a selection of an output lighting control signal and where a plurality of lighting control signals are pre-programmed in the control circuitry;
    c. illumination means located within the compartment, the illumination means having a plurality of light sources, which light sources are electrically connected with and controlled by the lighting control signals output by the control circuitry; and
    d. a power source located within the compartment, the power source including at least one rechargeable battery and is electrically connected with the electrical contact points, the control circuitry and the illumination means.

2. The electronic fish lure of claim 1, wherein the illumination means comprises at least three light sources.

3. The electronic fish lure of claim 1, wherein the electrical contact points function as charging terminals for the power source.

4. The electronic fish lure of claim 3, wherein the electrical contact points connect to a switching mechanism, a controlling mechanism, and a charging mechanism.

5. The electronic fish lure of claim 4, further comprising a multiplexing circuit between the electrical contact points and the switching mechanism, controlling mechanism and charging mechanism.

6. The electronic fish lure of claim 1, wherein the rechargeable battery is a lithium polymer rechargeable battery or other high efficiency battery.

7. The electronic fish lure of claim 1, wherein the waterproof housing is made of translucent material.

8. The electronic fish lure of claim 1, wherein the input control signals turn on the control circuitry and charge the power source.

* * * * *